United States Patent
Liu et al.

(10) Patent No.: US 7,216,900 B2
(45) Date of Patent: May 15, 2007

(54) FASTENER MODULE FOR PORTABLE COMPUTERS

(75) Inventors: Jen-Hao Liu, Taipei (TW); Jung-Sheng Chiang, Taipei (TW); Yu-Yuan Lin, Taipei (TW); Ko-Chun Cheng, Taipei (TW); Ching-Tan Chang, Taipei (TW); Pei Te Su, Taipei (TW)

(73) Assignee: Compal Electronics, Inc., Taipei (TW)

( * ) Notice: Subject to any disclaimer, the term of this patent is extended or adjusted under 35 U.S.C. 154(b) by 35 days.

(21) Appl. No.: 11/048,805

(22) Filed: Feb. 3, 2005

(65) Prior Publication Data

US 2006/0038415 A1   Feb. 23, 2006

(30) Foreign Application Priority Data

Aug. 19, 2004   (TW) .............................. 093213258

(51) Int. Cl.
*E05C 19/10*   (2006.01)
*H05K 5/00*   (2006.01)

(52) U.S. Cl. .................. 292/98; 292/111; 292/124; 292/251.5; 292/DIG. 37

(58) Field of Classification Search ............... 292/98, 292/11, 95, 251.5, 49, 108, 19, DIG. 37, 292/111, 124, 132, 224; 361/683
See application file for complete search history.

(56) References Cited

U.S. PATENT DOCUMENTS

| | | | | |
|---|---|---|---|---|
| 2,036,154 A | * | 3/1936 | Littledale | 292/170 |
| 2,927,814 A | * | 3/1960 | Reitzel | 292/335 |
| 3,090,643 A | * | 5/1963 | Barnes, Sr. | 292/170 |
| 4,637,642 A | * | 1/1987 | Stoecker | 292/129 |
| 4,875,721 A | * | 10/1989 | Okamoto et al. | 292/29 |
| 5,390,516 A | * | 2/1995 | Alchin | 70/100 |
| 5,551,737 A | * | 9/1996 | Clavin | 292/169 |
| 5,626,374 A | * | 5/1997 | Kim | 292/170 |
| 6,517,129 B1 | * | 2/2003 | Chien et al. | 292/251.5 |
| 6,659,516 B2 | * | 12/2003 | Wang et al. | 292/251.5 |
| 6,669,047 B2 | * | 12/2003 | Wooderson et al. | 220/316 |
| 6,707,665 B2 | * | 3/2004 | Hsu et al. | 361/681 |
| 6,890,008 B1 | * | 5/2005 | Chuang et al. | 292/121 |
| 6,927,972 B1 | * | 8/2005 | Wang et al. | 361/683 |
| 6,965,512 B2 | * | 11/2005 | Huang et al. | 361/683 |
| 7,050,295 B2 | * | 5/2006 | Kang | 361/683 |
| 2002/0089190 A1 | * | 7/2002 | Wang et al. | 292/251.5 |

* cited by examiner

*Primary Examiner*—Brian E. Glessner
*Assistant Examiner*—Carlos Lugo
(74) *Attorney, Agent, or Firm*—Bacon & Thomas, PLLC

(57) ABSTRACT

A fastener module for portable computers that is disposed on the host of a portable computer to fasten the LCD with the host, no matter whether the LCD is closed directly or after rotating 180 degrees; the fastener module has a pivotable eccentric hook rod biased in a normal horizontal position when not affected by magnetic effect, when the LCD closes on the host of the computer, both sides of the hook rod are affected by the magnetic effect of the magnetic component on the LCD; since the pivot of the hook rod is designed eccentrically, the magnetic moment generated by the magnetic effect for each side of the hook rod is different, so that the hook rod changes its position instantly from the normal horizontal state to a vertical state and hooks within the opening of the LCD to fasten the LCD onto the host of the portable computer.

12 Claims, 5 Drawing Sheets

FASTENER MODULE FOR PORTABLE COMPUTERS

BACKGROUND OF THE PRESENT INVENTION

1. Field of the Present Invention

The present invention relates generally to a fastener module for portable computers, and more particularly to a fastener module that is capable of fastening the LCD with the host of a portable computer no matter whether the LCD of the portable computer is closed directly or after rotating it 180 degrees.

2. Description of Prior Act

A commercial notebook computer has a LCD and a host, and the LCD is disposed to pivot on the host. Therefore, the LCD of a commercial notebook can be flipped upwards from or closed downwards onto the host.

A hook mechanism is disposed on one or each side of the LCD to hook the LCD securely onto the host of a notebook, when the LCD closes on the host of the notebook. A fastening mechanism is disposed on one or each side of the host at the position corresponding to the hook mechanism of the LCD and used to fasten the LCD and the host in conjunction with the hook mechanism. With the locking of the hook mechanism of the LCD and the fastening mechanism of the host, the LCD is hooked securely onto the host simultaneously when closed on the host. On the other hand, when the hook mechanism of the LCD and the fastening mechanism of the host separate from each other, the LCD is not hooked on the host anymore and can be flipped upwards easily.

However, most LCDs of commercial notebook computers are capable of rotating 180°, so that current notebooks with this function can be switched from the notebook mode to flat-panel computer mode.

In the circumstances, when the aforementioned prior art of hook mechanism is disposed on the LCD of such notebook and the LCD rotates 180° and closes on the host of the notebook, the LCD cannot be hooked onto the host, as the hook mechanism of the LCD becomes facing upwards.

SUMMARY OF THE PRESENT INVENTION

The primary objective of the present invention is to ensure that the LCD of a notebook computer is hooked securely onto the host thereof, no matter whether the LCD of the notebook computer is closed directly or after rotating 180 degrees. For this purpose, the hook mechanism of the prior art is moved to the host of the notebook computer.

The second objective of the present invention is to provide a fastener module for portable computers to be disposed on the host of a portable computer. Particularly, the fastener module has a pivotable eccentric hook rod. When the LCD of the portable computer does not close on the host, the hook rod, without being affected by magnetic effect, is in a normal horizontal state under the effect of an elastic component. When the LCD of the portable computer closes on the host thereof, both sides of the hook rod are affected by the magnetic effect generated by a magnetic component of the LCD. Since the pivot of the hook rod is designed eccentrically, the magnetic moment generated by the magnetic effect for each side of the hook rod is different, so that the hook rod changes its position instantly from normal horizontal state to vertical state and hooks in the opening of the LCD to fasten the LCD onto the host of the portable computer.

The third objective of the present invention is to provide a fastener module with a hook mechanism, comprising at least a base body, a slider, a release button, and a hook mechanism. The hook mechanism has an eccentrically disposed hook rod. When affected by magnetic effect on its top, the hook rod changes from horizontal to vertical position instantly. A sliding mechanism is formed between the slider and the base body, in which the slider slides laterally against the base body. Another sliding mechanism is formed between the release button and the base body, in which the release button slides lengthwise against the base body and drives the slider to slide laterally. When the hook rod is in a vertical state, the lengthwise sliding of the release button drives the slider to slide laterally and, in turn, drives the hook rod to restore from the current vertical position to a horizontal position.

BRIEF DESCRIPTION OF THE DRAWING FIGURES

DETAILED DESCRIPTION OF THE PREFERRED EMBODIMENTS

Figure 1:
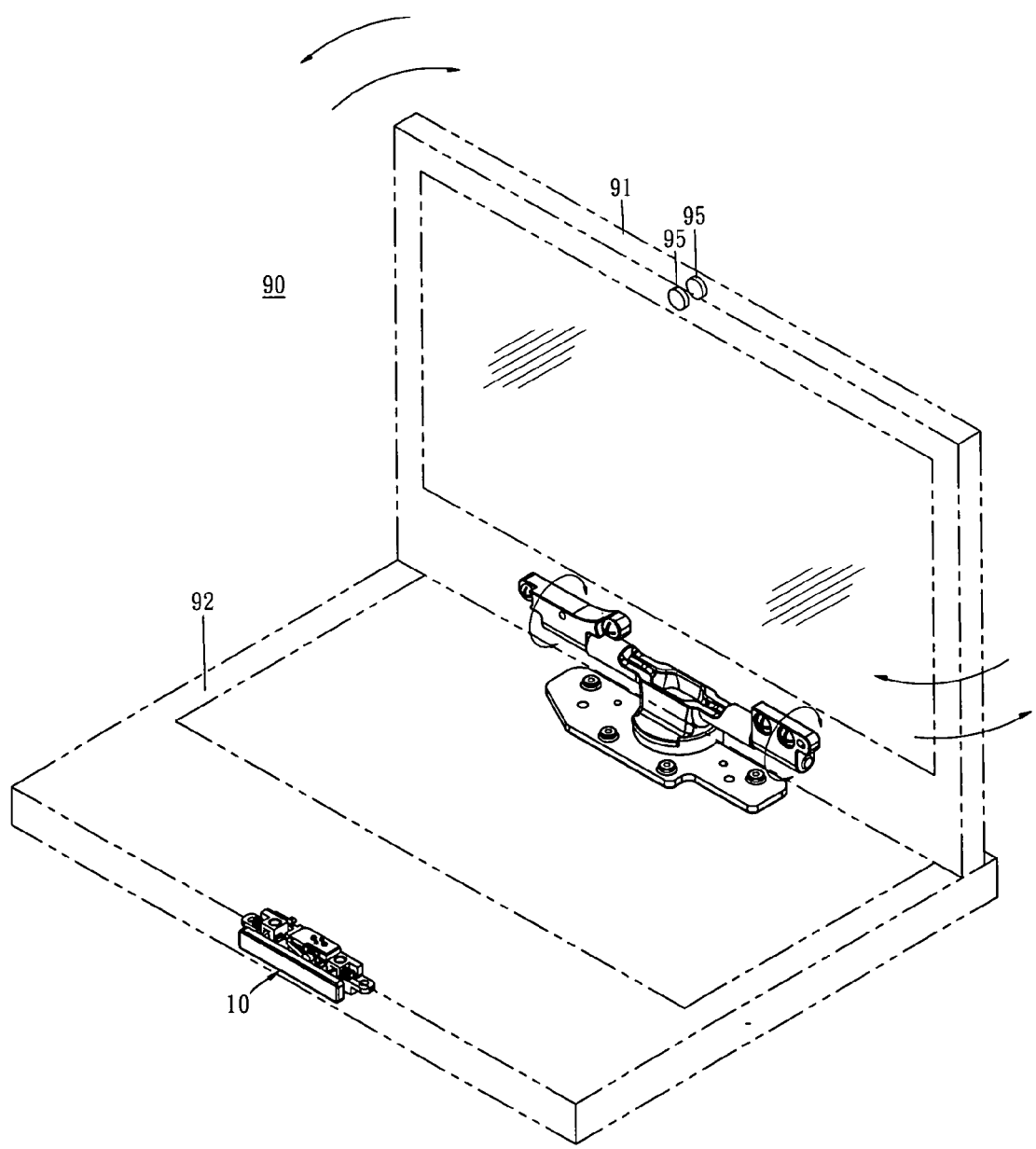
FIG. 1 shows a use state view of a fastener module (10) of the present invention that is disposed on a host (92) of an electronic device (90) such as a notebook computer.

As shown in FIG. 1, the fastener module (10) of the present invention is disposed on an electronic device (90) such as a notebook computer. When the LCD (91) of the electronic device (90) closes on the host (92) thereof directly or after rotating 180°, the fastener module (10) of the present invention is capable of forming a fastening state between the LCD (91) and host (92) of the electronic device (90).

Figure 4:
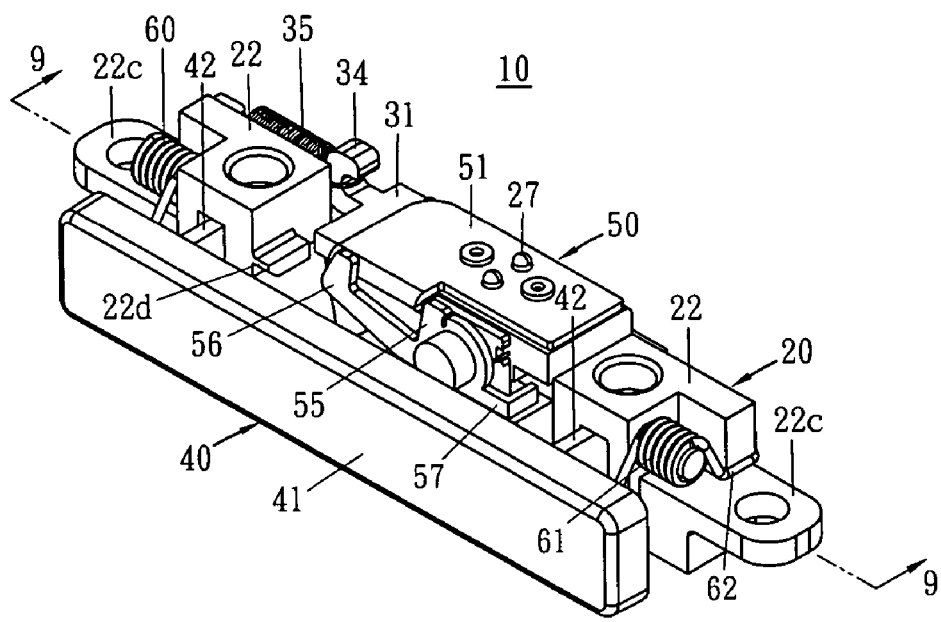
FIG. 4 shows a 3D schematic view of the fastener module (10) of the present invention.
Figure 5:
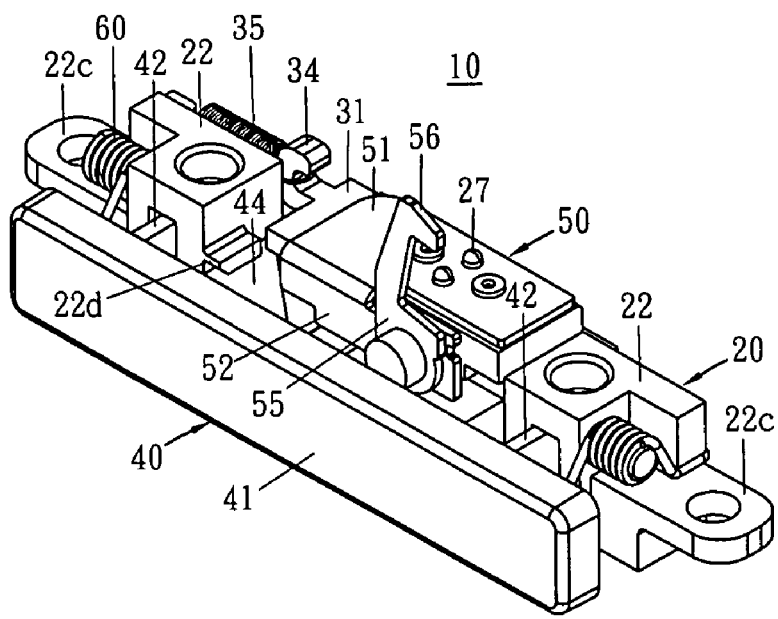
FIG. 5 shows a schematic view of fastening results with the hook rod (55) of the present invention changing its position instantly from horizontal state to vertical state under the magnetic effect.
Figure 6:
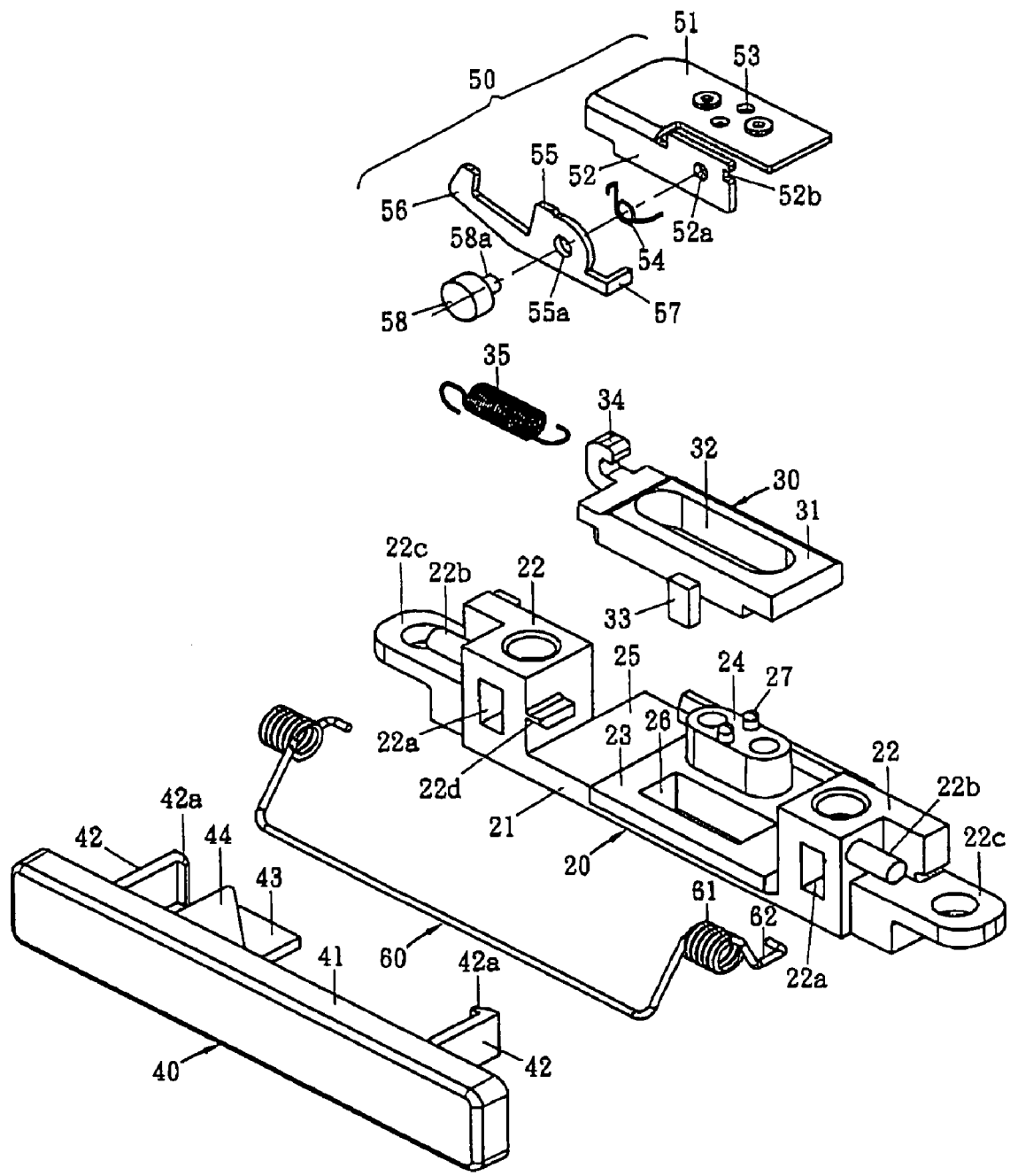
FIG. 6 shows an exploded view indicating parts of the fastener module (10) of the present invention.
Figure 7:
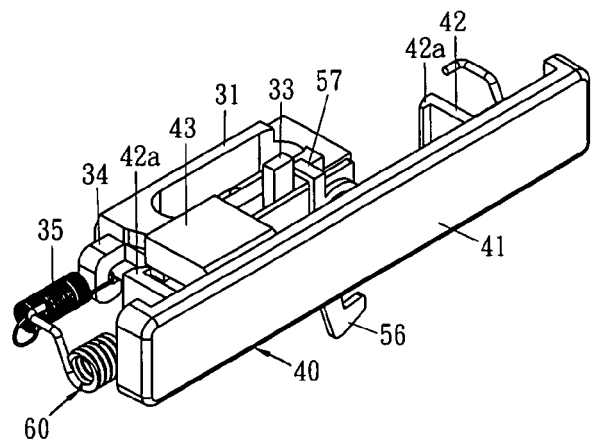
FIG. 7 shows a schematic view indicating the position of the hook rod (55) of the present invention located on one side of a driver (33) of a slider (30) when the hook rod (55) is in a vertical state.

As shown in FIGS. 4–6, the fastener module (10) of the present invention comprises a lengthwise base body (20), a slider (30), a release button (40), and a hook mechanism (50); or alternatively an elastic component (60) is added on the base body (20), so that the release button (40), after being pressed, is capable of being restored to its original position automatically under the effect of the elastic component (60).

Figure 9:
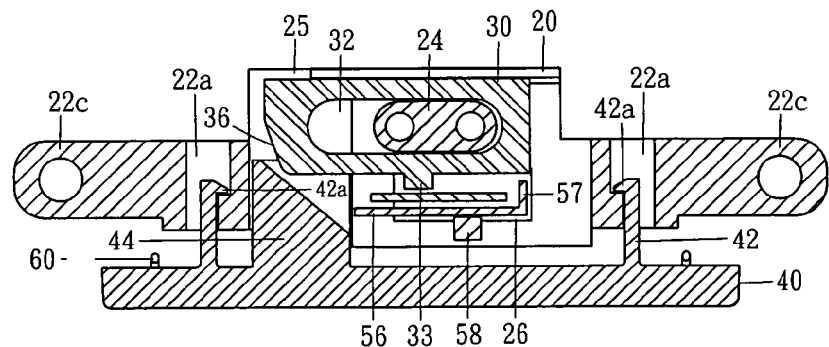
FIG. 9 shows a sectional view with a profile along 9-9 shown in FIG. 4.
Figure 10:
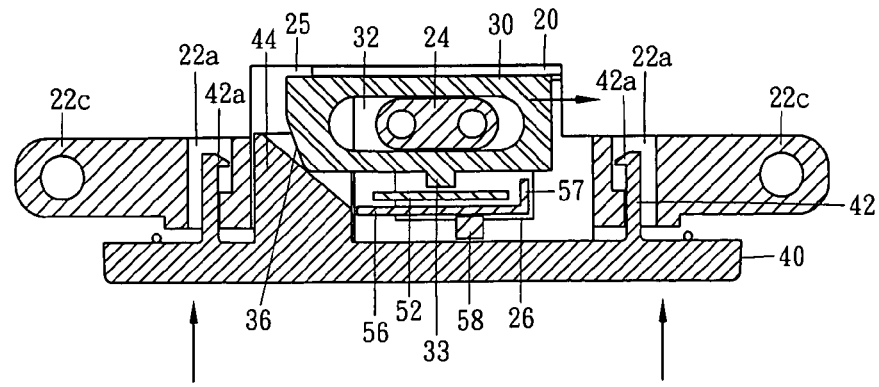
FIG. 10 shows a schematic view indicating that the lengthwise forward sliding of the release button (40) of the present invention drives the slider (30) to slide laterally.

As shown in FIGS. 9 and 10, a sliding mechanism is formed between the slider (30) and the base body (20), in which the slider (30) slides laterally against the base body. Another sliding mechanism is formed between the release button (40) and the base body (20), in which the release button (40) slides lengthwise against the base body (20). Particularly, the slider (30) is a driven part of the release button (40). When the release button (40) slides forward lengthwise, the slider is driven to slide laterally.

For the aforementioned purpose, the slider (30) of the present invention has a rectangular body (31) with a trough (32) that forms a sliding mechanism in conjunction with a guide block (24) of the base body (20). To the direction as shown in FIG. 6, a projection protrudes downwards out of the front sidewall of the body (31) of the slider (30), forming a driver (33) of the slider (30).

Another embodiment of the present invention has a protrudent hook (34) disposed on one side of the slider (30), so that a spring (35) can be disposed between the slider (30) and the base body (20). With the spring (35), the slider (30) can be restored to its original position after sliding laterally.

The release button (40) of the present invention has a lengthwise pressure plate (41) with a pair of symmetrically structured tenons (42) on its back. Each tenon (42) has a hook head (42a). The release button (40) has a slide plate (43) on its back, which has a bevel block (44) on the top.

Figure 8:
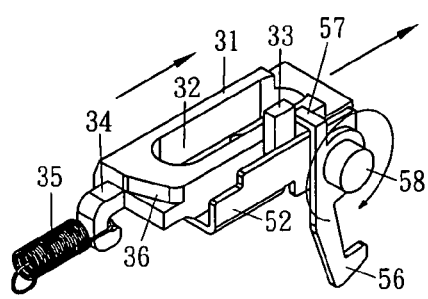
FIG. 8 shows a schematic view indicating that lateral sliding of the driver (33) of the slider (30) pushes the hook rod (55) of the present invention when the hook rod (55) is in vertical state and makes the hook rod (55) deviate to restore to horizontal state.

The slider (30) embodied in the present invention as shown in FIGS. 8 to 10 has a bevel (36) at the corner on the back of the body (31). When the release button (40) slides forward lengthwise, the slider (30) slides laterally smoothly due to the face-to-face contact between the bevel block (44) of the release button (40) and the bevel (36) of the slider (30).

Each one protrudent ridge is disposed on the right and left sides of the lengthwise body (21) of the base body (20), forming a sidewall (22) for both the right and left sides of the base body (20). Each one tenon slot (22a) with a profile as shown in FIG. 10 is disposed inside the sidewall (22). The tenon slot (22a) in the right and left sides of the base body (20) is used for insertion of the tenon rib (42) pair of the release button (40). When sliding backwards and forwards, the release button (40) will not come off due to the hooking of the dovetail (42a) in the tenon slot(22a) of the base body (20).

A raised axle (22b) is protrudently disposed on the outside surface of each sidewall (22) of the base body (20). With this structure, a swirl spring part (61) on each side of the elastic component (60) as shown in FIG. 6 is disposed as a pivot on the corresponding raised axle (22b), and an end (62) of each of the swirl spring part (61) is fixed on the corresponding side of the base body (20) to bring torsion spring to the swirl spring part (61).

A raised ear (22c) is protrudently disposed on the outside surface of each sidewall (22) of the base body (20). The fastener module (10) of the present invention is disposed on the host (92) of the electronic device (20) via the tap hole on the raised ear (22c).

The lengthwise body (21) of the base body (20) has a raised platform (23) on its panel to form a guide trough (25), in which the slide plate (43) of the release button (40) is inserted and slides therein to guide the release button (40) sliding vertically against the base body (20).

Another embodiment of the present invention has a protrudent limit rib (22d) on the inside surface of the sidewall (22) of the base body (20) adjacent to the guide trough (25). With the limit rib (22d) disposed above the guide trough (25), a drawer-like space is formed between the limit rib (22d) and the guide trough (25) for the slide plate (43) and bevel block (44) of the release button (40) to be inserted therein together. With this structure, the release button (40) will not come off when sliding vertically against the base body (20).

A guide block (24) and a groove (26) are protrudently disposed on the surface of the platform (23) of the base body (20). The guide block (24) of the platform (23) is covered with the trough (32) of the slider (30), so that a sliding mechanism is formed between the slider (30) and the base body (20) and the slider (30) is constrained to slide laterally against the base body (20). The guide block (24) has a plurality of pins (27) on its top to form a linking mechanism in conjunction with the hook mechanism (50).

The groove (26) of the platform (23) is used for the driver (33) of the slider (30) to be inserted in. When the slider (30) slides laterally, the driver (33) of the slider (30) slides laterally simultaneously in the groove (26) of the platform (23).

As shown in FIGS. 9 and 10, the slider (30) and the release button (40) form a sliding mechanism respectively in conjunction with the base body (20). When pushing the release button (40) to slide forwards lengthwise, the bevel block (44) of the release button (40) forces the slider (30) to slide laterally. When the pushing force to the release button (40) disappears, both the slider (30) and the release button (40) are restored to their original position under the elasticity of the elastic component (60) and the spring (35).

The hook mechanism (50) of the present invention has a cover (51), a side plate (52), a torsion spring (54), a hook rod (55), and a joint block (58). The cover (51) has a plurality of secure holes (53) on its top surface, which form a butt link in conjunction with the pins (27) of the guide block (24) of the base body (20). The hook mechanism (50) is fixed on the base body (20) via the butt link mechanism.

A link hole (52a) is disposed on the surface of the side plate (52). A pivot (58a) of the joint block (58) is linked to the link hole (52a) of the side plate (52) after being covered with the hook rod (55) and torsion spring (54). One end of the torsion spring (54) is fixed in a slot (52b) of the side plate (52) and the other end of the torsion spring (54) is fixed in the hook rod (55), so that the hook rod (55) is disposed on the pivot (58a) of the joint block (58). Thanks to the position of the torsion spring (54), the hook rod (55) is normally in horizontal state as shown in FIG. 4.

The hook rod (55) is made of metal and is affected naturally by potential magnetic effect of magnetic components. An eccentric pivot hole (55a) is disposed on the body of the hook rod (55). The pivot hole (55a) is used for linking with the pivot (58a) of the joint block (58) and as a parting dividing the body of the hook rod (55) into a longer fastening part (56) and a shorter trigger part (57).

As shown in FIG. 4, the hook rod (55) of the hook mechanism (50) is normally in a horizontal state. However, when the magnetic effect of a magnetic component is generated above and affected on the hook rod (55), and the magnetic force of the magnetic effect is greater than the torsion of the torsion spring (54), the body of the hook rod (55) changes its position instantly from horizontal to vertical state.

As shown in FIGS. 5 to 8, when the hook rod (55) of the hook mechanism (50) becomes vertical, the trigger part (57)

of the hook rod (55) passes the groove (26) of the base body (20) to reach the side of the driver (33) of the slider (30).

Figure 2:
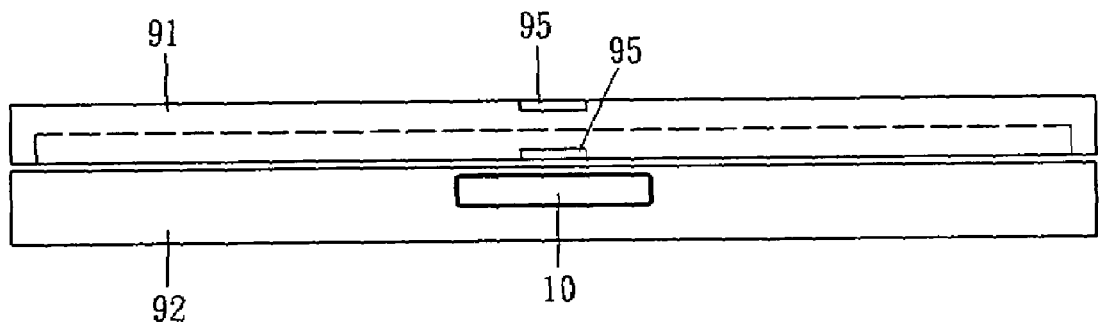
FIG. 2 shows a schematic view with the fastener module (10) of the present invention in fastening state when an LCD (91) of the electronic device (90) shown in FIG. 1 closes on the host (92)
Figure 3:
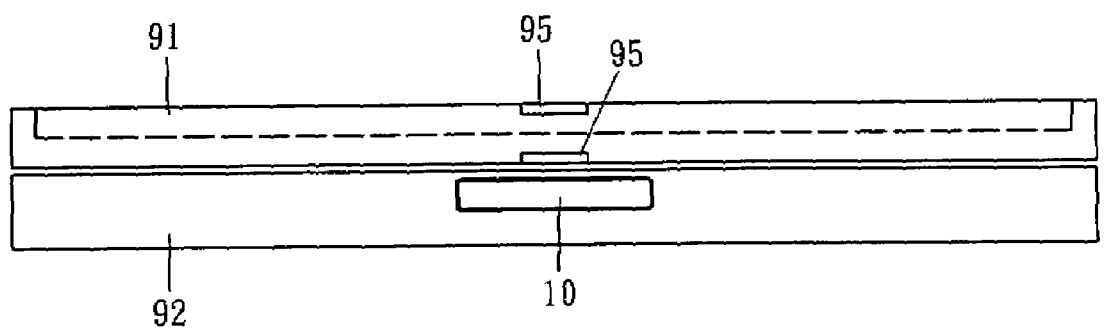
FIG. 3 shows a schematic view with the fastener module (10) of the present invention in fastening state when the LCD (91) of the electronic device (90) shown in FIG. 1 rotates 180° and closes on the host (92)

As shown in FIG. 1, the fastener module (10) of the present invention is disposed on the host (92) of the portable computer (90), which has a magnetic component (95) on the upper and lower sides close to the LCD (91); alternatively, the LCD (91) has a one-side dual-polarity magnetic component disposed on its side (not shown in the figure). As shown in FIGS. 2 and 3, when the LCD (91) of the portable computer (90) closes directly or after rotating 180° on the host (92), the hook rod (55) of the fastener module (10) on the host (92) changes its position instantly from horizontal to vertical state due to the magnetic effect and hooks in the opening (not shown in the figure) on the LCD (91), so that the LCD (91) fastens with and fixed securely on the host (92) of the portable computer (90).

As shown in FIGS. 8 and 10, pushing the release button (40) of the fastener module (10) can restore the hook rod (55) of the fastener module (10) to its normal horizontal position to separate the LCD (91) from the host (92) of the portable computer (90), so that the LCD (91) of the portable computer (90) can be flipped upwards. When the release button (40) slides forward lengthwise, the bevel block (44) on the back of the release button (40) slides forward lengthwise simultaneously to contact the bevel (36) of the slider (30). With this mechanism, the bevel block (44) imposes a force on the bevel (36) of the slider (30) and drives the slider (30) to slide laterally. Driven by the deriver (33) of the slider (30), the hook rod (55) comes out of the opening (not shown in the figure) on the LCD (91), so that the user can flip the LCD upwards easily. When the LCD (91) goes away from the host (92) of the portable computer (90) for a distance, the magnetic effect of the magnetic component (95) of the LCD (91) on the hook rod (55) becomes less than the torsion of the torsion spring (54), and the hook rod (55) restores to its normal horizontal position due to the torsion of the torsion spring (54).

What is claimed is:

1. A fastener module for portable computers which is disposed on a host of a portable computer, comprising:
   a base body, a slider, a release button and a hook mechanism, wherein
   said hook mechanism being disposed on said base body and having a pivotable hook rod with a normal horizontal position; said hook rod has a longer fastening part and a shorter trigger part divided by a pivot hole for said pivotable hook rod;
   said slider forming a first sliding mechanism in conjunction with said base body and sliding laterally against said base body; and
   said release button forming a second sliding mechanism in conjunction with said base body and sliding lengthwise against said base body;
   said release button having a bevel block and driving the slider to slide laterally via the bevel block when said release button slides forward lengthwise.

2. The fastener module for portable computers according to claim 1, wherein said base body has a guide trough and said release button has a slide plate, and the slide plate of said release button forms the second sliding mechanism in conjunction with the guide trough of said base body.

3. The fastener module for portable computers according to claim 1, wherein said base body has a guide block and said slider has a trough, and the trough of said slider forms the first sliding mechanism in conjunction with the guide block of said base body.

4. The fastener module for portable computers according to claim 2, wherein said base body has a guide block and said slider has a trough, and the trough of said slider forms the first sliding mechanism in conjunction with the guide block of said base body.

5. The fastener module for portable computers according to claim 1, wherein said slider has a driver and the trigger part of the hook rod of the hook mechanism is by the side of the driver of the slider when the trigger part is in a vertical state.

6. The fastener module for portable computers according to claim 2, wherein said slider has a driver and the trigger part of the hook rod of the hook mechanism is by the side of the driver of the slider when the trigger part is in a vertical state.

7. The fastener module for portable computers according to claim 3, wherein said slider has a driver and the trigger part of the hook rod of the hook mechanism is by the side of the driver of the slider when the trigger part is in a vertical state.

8. The fastener module for portable computers according to claim 4, wherein said slider has a driver and the trigger part of the hook rod of the hook mechanism is by the side of the driver of the slider when the trigger part is in a vertical state.

9. The fastener module for portable computers according to claim 1, wherein an elastic component is disposed between said release button and said base body, and a spring is disposed between said slider and said base body.

10. The fastener module for portable computers according to claim 2, wherein an elastic component is disposed between said release button and said base body, and a spring is disposed between said slider and said base body.

11. The fastener module for portable computers according to claim 5, wherein a corner on a back of said slider is designed as a bevel.

12. The fastener module for portable computers according to claim 6, wherein a corner on a back of said slider is designed as a bevel.

* * * * *